US012809972B2

(12) United States Patent
Chen et al.

(10) Patent No.: US 12,809,972 B2
(45) Date of Patent: Nov. 24, 2026

(54) MECHANISMS FOR DETECTING COMPUTER BOT

(71) Applicant: PayPal, Inc., San Jose, CA (US)

(72) Inventors: Zhe Chen, Singapore (SG); Panpan Qi, Singapore (SG); Solomon Kok How Teo, Singapore (SG); Yuzhen Zhuo, Singapore (SG); Quan Jin Ferdinand Tang, Singapore (SG); Omkumar Mahalingam, Santa Clara, CA (US); Fei Pei, San Jose, CA (US); Mandar Ganaba Gaonkar, San Jose, CA (US)

(73) Assignee: PayPal, Inc., San Jose, CA (US)

( * ) Notice: Subject to any disclaimer, the term of this patent is extended or adjusted under 35 U.S.C. 154(b) by 398 days.

(21) Appl. No.: 18/459,169

(22) Filed: Aug. 31, 2023

(65) Prior Publication Data

US 2025/0077658 A1 Mar. 6, 2025

(51) Int. Cl.
*G06F 21/55* (2013.01)

(52) U.S. Cl.
CPC .......... *G06F 21/554* (2013.01); *G06F 21/552* (2013.01); *G06F 2221/2133* (2013.01)

(58) Field of Classification Search
CPC ................. G06F 21/554; G06F 21/552; G06F 2221/2133; G06F 21/316
USPC ............................................................ 726/22
See application file for complete search history.

(56) References Cited

U.S. PATENT DOCUMENTS

| | | | | |
|---|---|---|---|---|
| 9,930,053 | B2 | 3/2018 | Beauchesne | |
| 9,954,841 | B2 | 4/2018 | Rapaport et al. | |
| 10,187,408 | B1 * | 1/2019 | Call | G06F 21/566 |
| 10,491,697 | B2 * | 11/2019 | Wang | H04L 67/535 |
| 10,587,629 | B1 * | 3/2020 | Kurupati | H04L 63/1408 |
| 10,587,636 | B1 | 3/2020 | Aziz et al. | |
| 11,532,207 | B2 * | 12/2022 | Zavesky | A63F 13/77 |

(Continued)

FOREIGN PATENT DOCUMENTS

WO WO2023185925 * 3/2023

*Primary Examiner* — Sharon S Lynch
(74) *Attorney, Agent, or Firm* — Kowert, Hood, Munyon, Rankin & Goetzel, P.C.; Mark D. Seegers; Dean M. Munyon

(57) ABSTRACT

Techniques are disclosed that relate to predicting whether a computer-based interaction is being performed by a computer bot. A computer system may receive information describing exhibited user-presence indicators of different types that are associated with the computer-based interaction, including user-presence indicators indicative of whether the computer-based interaction is being performed by a computer bot. The computer system performs a first embedding operation to create a unified embedding that unifies the exhibited user-presence indicators into a single embedding that is representative of an aggregation of the exhibited user-presence indicators. The computer system performs a second embedding operation to create a difference embedding that is representative of a set of differences between expected user-presence indicators for the computer-based interaction and the exhibited user-presence indicators. Based on the unified embedding and the difference embedding, the computer system generates a prediction on whether the computer-based interaction is being performed by a computer bot.

19 Claims, 11 Drawing Sheets

(56) References Cited

U.S. PATENT DOCUMENTS

| | | | | |
|---|---|---|---|---|
| 11,627,147 | B2 * | 4/2023 | Lotia | H04L 63/1425 726/23 |
| 11,783,327 | B2 * | 10/2023 | Chakraborty | G06Q 20/3825 705/67 |
| 11,902,305 | B2 * | 2/2024 | Lotia | H04L 63/1425 |
| 2010/0328074 | A1 * | 12/2010 | Johnson | G06F 21/31 340/573.1 |
| 2015/0379266 | A1 * | 12/2015 | McLaughlin | H04L 63/14 726/23 |
| 2017/0230418 | A1 * | 8/2017 | Amar | H04L 63/10 |
| 2018/0268317 | A1 * | 9/2018 | Dharwadker | G06F 16/9535 |
| 2019/0207975 | A1 * | 7/2019 | Wardman | H04L 63/1483 |
| 2019/0253504 | A1 * | 8/2019 | Wang | H04L 63/1483 |
| 2020/0053558 | A1 * | 2/2020 | Hallock | G06N 3/09 |
| 2020/0134019 | A1 * | 4/2020 | Podgorny | G06N 3/0455 |
| 2020/0167772 | A1 * | 5/2020 | Chakraborty | G06Q 20/3825 |
| 2020/0186539 | A1 * | 6/2020 | Chakra | G06F 21/552 |
| 2022/0129625 | A1 * | 4/2022 | Zucker | G06F 16/2264 |
| 2022/0147602 | A1 * | 5/2022 | Streit | G06V 10/82 |
| 2022/0150068 | A1 * | 5/2022 | Streit | G06F 21/316 |
| 2022/0277064 | A1 * | 9/2022 | Streit | G06V 40/1365 |
| 2023/0104757 | A1 * | 4/2023 | Pramod | G06N 3/0475 706/11 |
| 2023/0359829 | A1 * | 11/2023 | Yuan | G06N 3/042 |
| 2023/0379348 | A1 * | 11/2023 | Mangarella | H04L 63/1416 |
| 2024/0281507 | A1 * | 8/2024 | Burström | H04L 67/535 |
| 2024/0370808 | A1 * | 11/2024 | Leung | G06N 3/045 |
| 2025/0077658 | A1 * | 3/2025 | Chen | G06F 21/316 |

* cited by examiner

MECHANISMS FOR DETECTING COMPUTER BOT

BACKGROUND

Technical Field

This disclosure relates generally to computer systems and, more specifically, to various mechanisms for generating a prediction for whether a computer-based interaction is performed by a computer bot.

Description of the Related Art

Enterprises are increasingly utilizing machine learning to enhance the services that they provide to their users. Using machine learning techniques, a computer system can train models from existing data and then use them to identify similar trends in new data. In some cases, the training process is supervised in which the computer system is provided with labeled data that it can use to train a model. For example, a model for identifying spam can be trained based on emails that are labeled as either spam or not spam. Examples of supervised learning algorithms include linear regression, logistic regression, and support vector machines. In other cases, the training process can be unsupervised in which the computer system is provided with unlabeled data that it can use to train a model to discover underlying patterns in that data. Unsupervised training may be favored in scenarios in which obtaining labeled data is difficult, costly, and/or time-consuming.

DETAILED DESCRIPTION

Figure 1:
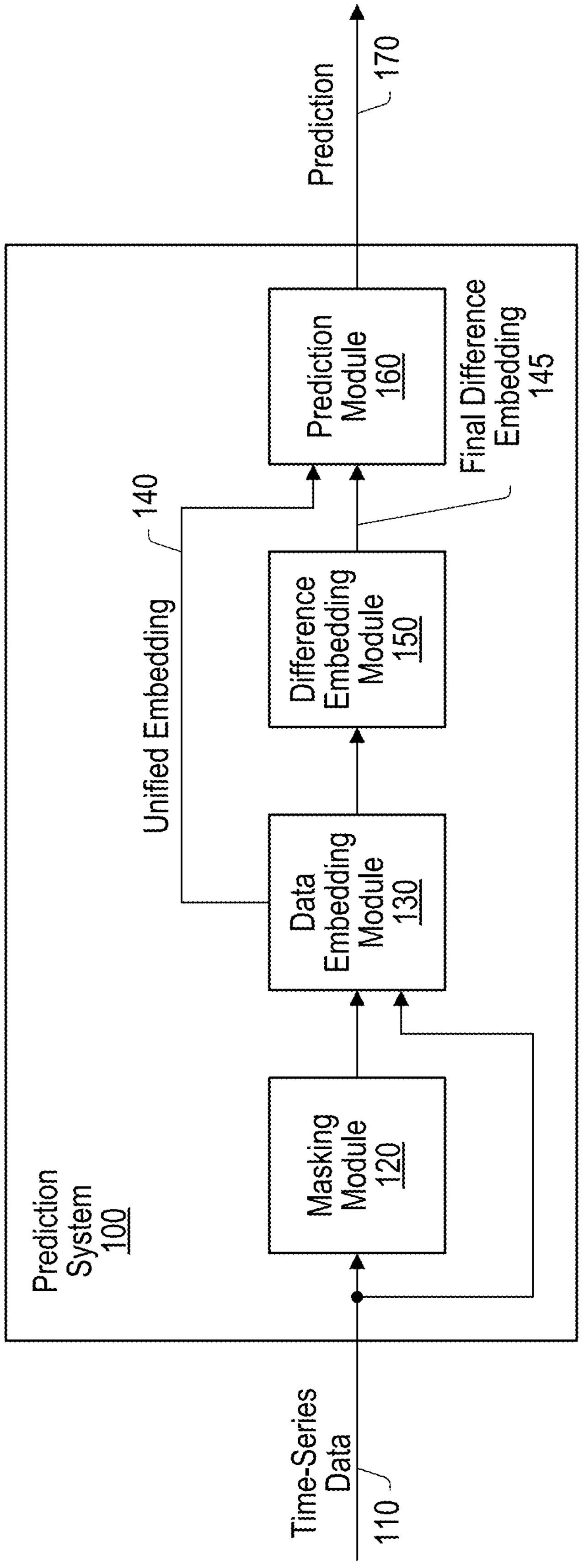
FIG. 1 is a block diagram of one embodiment of a prediction system that is capable of predicting whether a set of characteristics (e.g., performed by a computer bot) is exhibited in a computer-based interaction.

Computer systems generally implement different types of computer-based interactions, often on behalf of users. Some of those computer-based interactions can be detrimental to the computer systems and/or the users if they exhibit certain characteristics. Network traffic that exhibits abnormal behavior (e.g., an unusual log-in request) might be indicative of a computer bot attempting to infiltrate a computer system to cause adverse or otherwise negative effects. For example, a computer bot may perform an automated sign-up to create a new account on a platform in order to post malicious links to users. As another example, a computer bot may perform a password attack (e.g., brute force a login) to gain unauthorized access to a user's account. It may thus be desirable to detect or otherwise predict if a computer-based interaction (e.g., a sign-up) is being performed by a computer bot as this may permit the computer-based interaction to be stopped or prevented.

One conventional approach to detect a computer bot is using a "Completely Automated Public Turing test to tell Computer and Humans Apart" (CAPTCHA) test. A CAPTCHA is a security test designed to determine whether the user is human. A CAPTCHA can include a text-based, picture-based, and/or audio-based test. For example, CAPTCHAs may require a user to identify distorted letters, type the correct sequence of those letters into a form field, and then submit the form. This conventional approach is deficient, however, as computer bots can overcome these security tests, using a variety of techniques. For example, a computer bot may recognize patterns in CAPTCHA tests using machine learning algorithms and training data and then utilize that pattern recognition to pass subsequent tests. In another example, a computer bot may use optical character recognition technology to analyze and recognize the text from a text-based test and thus pass the test. As computer bots become more sophisticated, CAPTCHA tests become less useful as the computer bots can easily pass the tests. Thus, it is desirable to implement a different approach for detecting computer bots. This disclosure addresses, among other things, the problem of how to predict whether a computer-based interaction is performed by a computer bot.

In various embodiments described below, a system comprises a prediction system that can generate a prediction on whether a computer-based interaction is performed by a computer bot. The prediction may be based on time-series data (e.g., user-presence indicators) recorded during a user session. As part of generating one or more predictions, in various embodiments, the prediction system receives time-series data with unique timestamps that describes one or more computer-based interactions. For example, time-series data may include typing pattern data, sensor reading data, and user-agent data associated with a user session involving a login to the system. The prediction system may initially convert the time-series data into a sequence of payload embeddings and then mask one or more payload embeddings at specific timestamps within the sequence to simulate missing data. An embedding, in various embodiments, is a mathematical representation of information, expressed as a vector in space. That vector may include n-values for an n-dimensional space. Using the sequence of payload embeddings, in various embodiments, the prediction system then performs an encoding operation in which it encodes the payload embeddings from each data source (e.g., the typing pattern data) into one or more weighted embeddings (e.g., using a transformer model comprising a neural network that learns context and relationships between the sequential payload embeddings, using a self-attention and dense layer). The prediction system may implement an additional attention layer that uses the weighted embeddings to produce context-aware embeddings and then the context-aware embeddings may be aggregated by the prediction system into a unified embedding.

Further, using the weighted payload embeddings generated by the transformer model, in various embodiments, the prediction system predicts, for a given timestamp, the content of the payload occurring at that given timestamp (referred to as the expected payload embedding) based on the payload embeddings occurring before the given timestamp. The predicted payload embedding may reflect the content with the highest probability of occurring in a licit computer-based interaction. The prediction system may then analyze the differences between the actual payload embeddings and the expected payload embeddings and represent their differences in a difference embedding. After the unified embedding and the difference embedding have been generated, in various embodiments, the prediction system aggregates those embeddings into a single representation (e.g., a single embedding) and then performs a prediction with respect to the computer-based interaction (e.g., whether it involves a computer bot) based on that single representation. The prediction system may send that prediction to a separate computer system that is executing the computer-based interaction to allow for it to decide whether to continue executing or terminate the computer-based interaction.

These techniques may be advantageous over prior approaches as these techniques allow for a system to predict whether a computer-based interaction is performed by a computer bot using different types of user-presence indicators recorded during the interaction. For example, the system may determine that a computer-based interaction is performed by a computer bot based on exhibited sensor-reading data generated during the interaction. As a user types on a mobile device during an interaction, the mobile device experiences vibrations and/or rotational movements from the impact of the user's fingers on the screen. But with a computer bot, there are no such movements from a physical device. Thus, this property (encapsulated in the sensor reading data) allows for better bot detection. Moreover, the use of machine learning techniques (e.g., neural network) in the prediction process allows for the system to process all sequential user-presence indicators in parallel (reducing time costs) and model the abnormalities between the exhibited interaction and licit computer-based interactions. Based on this abnormality, the computer system may predict the presence of a computer bot and block the computer bot from executing from completing the interaction.

Turning now to FIG. 1, a block diagram of a prediction system 100 is shown. Prediction system 100 includes a set of components that may be implemented via hardware or a combination of hardware and software. In the illustrated embodiment, system 100 includes a masking module 120, a data embedding module 130, a difference embedding module 150, and a prediction module 160. As further shown, prediction system 100 receives time-series data 110. The illustrated embodiment may be implemented differently than shown. As an example, prediction system 100 may not include masking module 120.

Prediction system 100, in various embodiments, is a system that generates predictions 170 on whether a computer-based interaction is being performed by a computer bot. In some embodiments, prediction system 100 is part of a platform that provides one or more services (e.g., a cloud computing service, a customer relationship management service, and a payment processing service) that are accessible to users that can invoke functionality of the services to achieve a user-desired objective. To facilitate the functionality of those services, prediction system 100 may execute various software routines, such as data embedding module 130, as well as provide code, web pages, and other data to users, databases, and other entities that use system 100. In various embodiments, prediction system 100 is implemented using a cloud infrastructure that is provided by a cloud provider. Components of prediction system 100 may thus execute on and use cloud resources of that cloud infrastructure (e.g., computing resources, storage resources, etc.) to facilitate their operation. For example, software that is executable to implement data embedding module 130 may be stored on a non-transitory computer-readable medium of server-based hardware included in a datacenter of the cloud provider. That software may be executed in a virtual environment that is hosted on the server-based hardware. In some embodiments, prediction system 100 is implemented using a local or private infrastructure as opposed to a public cloud.

As mentioned, prediction system 100, in various embodiments, produces a prediction on whether a computer-based interaction is being performed by a computer bot. A computer-based interaction may include any type of interaction that is facilitated by computer systems—examples of different types of computer-based interactions include, but are not limited to, authentication/verification interactions (e.g., logins), registration interactions (e.g., signups), and payment transaction interactions. Computer-based interactions can be associated with user-presence indicators. A user-presence indicator, in various embodiments, refers to a metric or signal that may be indicative of the presence of a user, and it may take the form of payloads generated during a computer-based interaction. As an example, a user presence indicator may include the typing pattern (which may be indicative of a user) that is recorded during a log-in process.

As shown, to facilitate the generation of prediction 170, prediction system 100 receives time-series data 110, which may be received from a user session (initiated via a user interface (e.g., a web browser) or by a computer bot), a database, a separate computer system, etc. Time-series data 110, in various embodiments, is a sequence of payloads (comprising user-presence indicators) recorded at regular intervals during the execution of a computer-based interaction, and each payload is associated with a unique timestamp. Time-series data 110 may include one or more sequences of payloads from a plurality of data sources. For example, time-series data 110 may include payloads describing a user's typing patterns, sensor readings from the user's device, and information about the user's device (e.g., user-agent information) used during the associated interaction. In some embodiments, time-series data 110 recorded during a computer-based interaction is stored in a database so that it can be subsequently retrieved by prediction system 100.

In some embodiments, time-series data 110 includes unprocessed raw data collected from the user session. For example, the raw data may include various formats such as text, numbers, instrument readings, audio, etc. In various embodiments, the raw data from each payload is first encoded, using feature extraction techniques, into initial vector representations (i.e., payload embeddings). Feature extraction, in various embodiments, is a process that transforms the raw data by reducing the dimensionality of the payloads to extract only the relevant information (e.g., features). For example, feature extraction techniques may be used to extract the average key press duration for a user. By transforming the payloads into payload embeddings, prediction system 100 can better understand the data and make more accurate predictions. In some cases, prediction system 100 may receive time-series data 110 that has been transformed into payload embeddings—i.e., prediction system 100 may receive embeddings instead of raw data.

The generation of prediction 170 can involve the use of various software modules. As shown, prediction system 100 comprises masking module 120, data embedding module 130, difference embedding module 150, and prediction module 160. Masking module 120, in various embodiments, is software executable to receive time-series data 110 and mask particular payload embeddings within time-series data 110, using a probability function (e.g., Bernoulli distribution), to simulate missing information. Masking module 120, in various embodiments, replaces a payload embedding at a particular timestamp with a default value associated with masked or missing data. In some embodiments, masking module 120 may only be used in the training phase to train prediction system 100 while in other embodiments, masking module 120 may be used in both the training and active phases. Masking module 120 is discussed in greater detail with respect to FIG. 2. As shown, masked module 120 provides time-series data 110, containing masked payloads, to data embedding module 130.

Data embedding module 130, in various embodiments, is software executable to encode the payload embeddings from each data source (e.g., the user typing data, the sensor readings, etc.) into context-aware embeddings and aggregate the context-aware embeddings into unified embedding 140. Unified embedding 140, in various embodiments, represents the content of all payloads in a single vector—i.e., the unified embedding may be a single representation of all content embeddings from all data sources associated with a computer-based interaction. In various embodiments, data embedding module 130 generates context-aware embeddings based on the sequence of payload embeddings containing masked payloads. In other embodiments, data embedding module 130 generates context-aware embeddings directly from the payload embeddings generated from time-series data 110. Data embedding module 130 is described in greater detail with respect to FIGS. 3A and 3B. Data embedding module 130 sends a sequence of payload embeddings (e.g., a weighted version of the sequence of payload embeddings from time-series data 110) from each data source to difference embedding module 150.

Difference embedding module 150, in various embodiments, is software executable to predict the content of a payload (e.g., expected payloads) in the next timestamp based on the payload(s) from the previous timestamps. Difference embedding module 150 may measure and aggregates the differences (e.g., anomalies) between the expected payload embeddings and the exhibited payload embeddings into a single representation (i.e., final difference embedding 145). Difference embedding module 150 is discussed in greater detail with respect to FIGS. 4A and 4B. As depicted, unified embedding 140 and final difference embedding 145 are provided to prediction module 160.

Prediction module 160, in various embodiments, generates prediction 170 that indicates whether a computer-based interaction is thought to be performed by a computer bot, based on an aggregation of unified embedding 140 and final difference embedding 145. Prediction system 100 may utilize prediction 170 to determine whether or not to continue executing the computer-based interaction. If a computer-based interaction is predicted as being performed by a computer bot, then, in various cases, prediction system 100 may block the interaction or notify another computer system to block the interaction. Prediction module 160 is discussed in greater detail with respect to FIG. 5.

Figure 2:
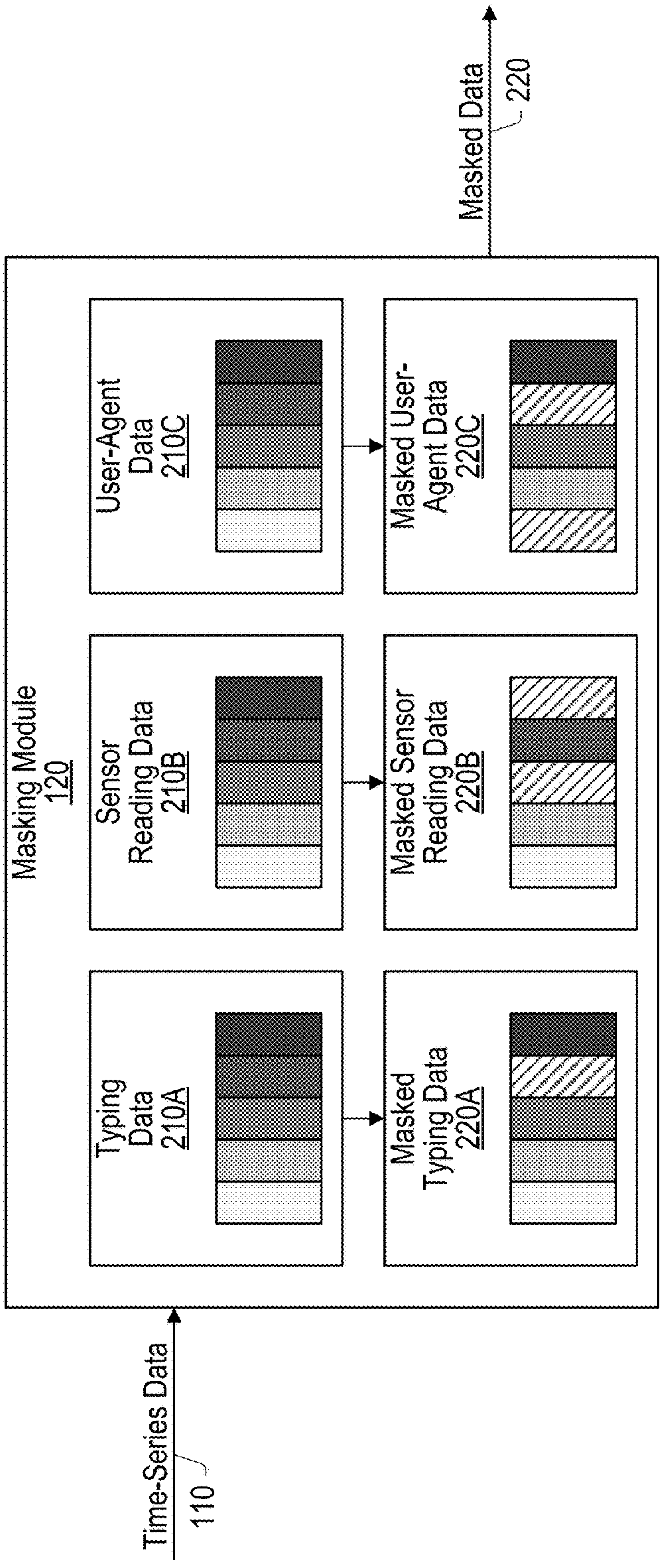
FIG. 2 is a block diagram of one embodiment of a masking module that is capable of masking payload embeddings from time-series data.

Turning now to FIG. 2, a block diagram of an example of masking module 120 masking data is shown. In the illustrated embodiment, masking module 120 receives time-series data 110. In the illustrated embodiment, time-series data 110 includes typing data 210A, sensor reading data 210B, and user-agent data 210C. In some embodiments, masking module 120 is implemented differently than shown. As an example, masking module 120 may receive and utilize user input when determining which payloads to mask.

As discussed, masking module 120 can mask payload embeddings in time-series data 110 to generate masked data 220. In some embodiments, time-series data 110 is received in a different format (e.g., a raw data format) than an embedding format and thus masking module 120 may convert time-series data 110 into a set of payload embeddings. As shown, time-series data 110 comprises typing data 210A, sensor reading data 210B, and user-agent data 210C, all of which may be part of a sequence of payloads generated, e.g., during a log-in process. Time-series data 110, in various embodiments, includes a set of payloads for each of the respective types of data (e.g., type data embeddings, sensor reading embeddings, etc.).

Typing data 210A, in various embodiments, corresponds to a sequence of typing patterns produced during a computer-based interaction. For example, a payload at a particular timestamp for typing data 210A may include the x and y coordinates of the text field on a webpage and the time interval between consecutive typing interactions during a log-in process. A sequence of payloads with typing data 210A can indicate a movement of typing across a web page and/or multiple fields. As an example, a user may input text into a username field followed by a password field during a log-in process, the flow of which can recorded as typing data 210A in a sequence of payloads. Typing data 210A may also include typing biometrics, such as typing speed and pressure applied to the screen of a mobile device by a user.

Sensor reading data 210B, in various embodiments, corresponds to a sequence of sensor readings recorded by a computing device during a computer-based interaction. For example, sensor reading data 210B may include values recorded on the x, y, and z axis from an accelerometer sensor and a gyroscope sensor of a mobile device during a computer-based interaction. The accelerometer sensor may record the orientation, tilt, and movement of the mobile device in a three-dimensional space, and the gyroscope sensor may record the angular velocity of the mobile device in a three-dimensional space. The readings from the sensors may be used to identify movements and vibrations of the mobile device as a user types on the screen of their device.

User-agent data 210C, in various embodiments, corresponds to a sequence of characters (e.g., string) that describes the computing device used during the computer-based interaction. User-agent data 210C may include information about the operating system, the model of the user's computing device, and the web browser. Examples of user-agent data 210C include:

Mozilla/5.0(Linux;Android10; LYA-L29Build/HUAWEI LYA-L29;wv)AppleWebKit/537.36(KHTML, likeGecko) Version/4.0Chrome/85.0.4183.101MobileSafari/537.36

Time-series data 110, in various embodiments, may include additional metadata describing the computer-based interaction.

To mask data of time-series data 110, in various embodiments, masking module 120 uses a Bernoulli distribution to randomly determine whether to mask the payload embedding at each time interval for all data sources of time-series data 110 by replacing the payload embedding with a masking value, resulting in masked data 220. For example, masking module 120 may replace a payload embedding with a default mask embedding having "−1" for values to indicate that the payload embedding is missing for a particular time interval. Masked data 220, in various embodiments, is a combination of a set of payload embeddings and one or more masked payload embeddings in time-series data 110 and is used to simulate missing data—the one or more masked payload embeddings are considered missing when generating prediction 170. As shown, masking module 120 received time-series data 110 that includes a set of five payload embeddings for typing data 210A, sensor reading data 210B, and user-agent data 210C. In the illustrated embodiment, masking module 120 masks one payload embedding for typing data 210A, two payload embeddings for sensor reading data 210B, and two payload embeddings for user-agent data 210C, resulting in masked typing data 220A, masked sensor reading data 220B, and masked user-agent data 220C respectively.

In various embodiments, masked data 220 is used in the training phase of the machine learning models used to produce prediction 170 and even in the active phase in which those models are used to produce prediction 170. But in some embodiments, masked data 220 is not used in the active phase as the data may already be incomplete. In other embodiments, masking data 220 may be used selectively in the active phase to ensure that at least some amount of data is missing—e.g., masking might be applied to a complete set of data but not to an incomplete set of data during the active phase (and/or training phase). After generating masked data 220, masking module 120 provides masked data 220 to data embedding module 130.

Figure 3A:
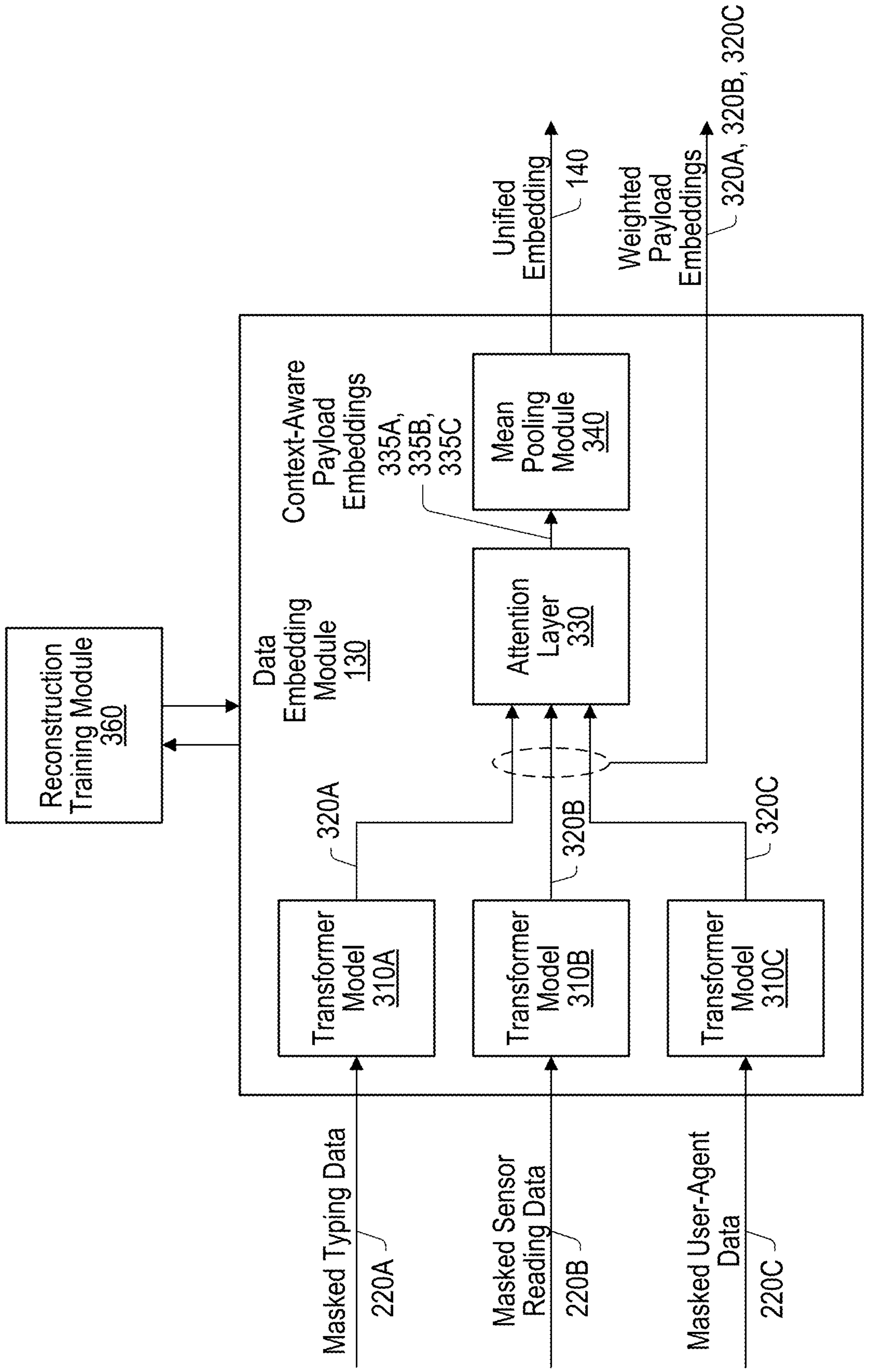
FIG. 3A is a block diagram of one embodiment of a data embedding module that is capable of encoding and aggregating a sequence of payload embeddings into a unified embedding.

Turning now to FIG. 3A, a block diagram of data embedding module 130 is shown. In the illustrated embodiment, data embedding module 130 includes transformer models 310A-C, an attention layer 330, and a mean pooling module 340. The illustrated embodiment further includes a reconstruction training module 360. In some embodiments, data embedding module 130 is implemented differently than shown. For example, data embedding module 130 may not include reconstruction training module 360.

Data embedding module 130, in various embodiments, transforms the payload embeddings of each data source (e.g., data 220A, 220B, and 220C) into context-aware embeddings and aggregates the context-aware embeddings into unified embedding 140. Data embedding module 130 can receive masked data 220 from masking module 120 and provide the respective types of data in masked data 220 to respective transformer models 310—e.g., masked typing data 220A is provided to transformer model 310A as depicted. A transformer model 310, in various embodiments, is a machine learning construct that can produce one or more weighted embeddings (e.g., weighted payload embedding 320) from masked data 220, using positional encoding, a self-attention layer, and a dense layer. Transformer model 310 may receive N payload embeddings and produce N weighted payload embeddings 320. For example, transformer model 310A receives masked typing data 220A, masked sensor reading data 220B, and masked user-agent data 220C and produces weighted payload embedding 320A, weighted payload embedding 320B, and weighted payload embedding 320C respectively. Transformer model 310 is discussed in greater detail with respect to FIG. 3B. As shown, weighted payload embeddings 320A-C are provided to attention layer 330.

Attention layer 330, in various embodiments, is a neural network layer that is used to further assign additional weighted values to each weighted payload embedding 320, using an attention mechanism (e.g., attention layer), based on the embedding's level of importance towards bot detection relative to the other weighted embeddings 320. Although attention layer 330 is an attention layer similar to that of a transformer model, the attention layer is used to compare the weighted embeddings across multiple data sources while the self-attention layer used by the transformer compares payload embeddings from one data source. In various embodiments, a higher weighted value equates to better bot detection. For example, if attention layer 330 determines that a typing weighted payload embedding 320A is more important than a user-agent weighted payload embedding 320C, then attention layer 330 assigns a greater weighted value to that particular typing weighted payload embedding 320A. In some embodiments, the set of weights used in transformer models 310A-C and attention layer 330 may be initialized randomly and are updated through a training process. The training process (implemented using reconstruction training module 360) is discussed in further detail with respect to FIG. 3B. Attention layer 330 applies additional weights to the weighted embeddings 320, producing context-aware payload embeddings 335A-C. Attention layer 330 then sends those context-aware payload embeddings 335A-C to mean pooling module 340.

Mean pooling module 340, in various embodiments, is software that is executable to generate unified embedding 140 through mean pooling. In mean pooling, the received context-aware payload embeddings 335A-C are averaged by adding them together and then dividing by the total number of embeddings, resulting in unified embedding 140. As mentioned, unified embedding 140, in various embodiments, represents the total content of all payloads in a single vector. After being generated, unified embedding 140 may then be provided by mean pooling module 340 to prediction module 160—also, weighted payload embeddings 320A-C may be provided by their respective transformer models 310 to difference embedding module 150. To improve data embedding module's 130 ability to generate future unified embeddings 140, unified embedding 140 may be provided to reconstruction training module 360.

Reconstruction training module 360, in various embodiments, is software that is executable to decode unified embedding 140 into context-aware payload embeddings 335A-C. For example, reconstruction training module 360 may attempt to reconstruct context-aware payload embeddings 335A-C for typing data, sensor reading data, and user-agent data, respectively, based on unified embedding 140. In other embodiments, reconstruction training module 360 decodes unified embedding 140 into the original input embeddings from the computer-based interaction. For example, reconstruction training module 360 reconstructs the typing data payload embeddings, sensor reading payload embedding, and user-agent payload embeddings from time-series data 110 based on unified embedding 140. In some embodiments, the reconstructed context-aware payload embeddings are compared to the original context-aware payload embeddings 335A-C to determine the performance of the encoders (e.g., models 310A-C). In other embodiments, the reconstructed input payload embeddings are compared to the original input payload embeddings from time-series data 110 to determine the performance of the encoders. Then, in various embodiments, reconstruction training module 360 adjusts the weights used during the encoding process (e.g., transformer models 310A-C) to minimize the differences between the reconstructed input embeddings and the original input embeddings. In various embodiments, reconstruction training module 360 may decode unified embedding 140 into a decoded version of weighted payload embeddings 320A-C and then, based on a comparison between the actual version and decode version, adjust the weights used in attention layer 330.

Figure 3B:
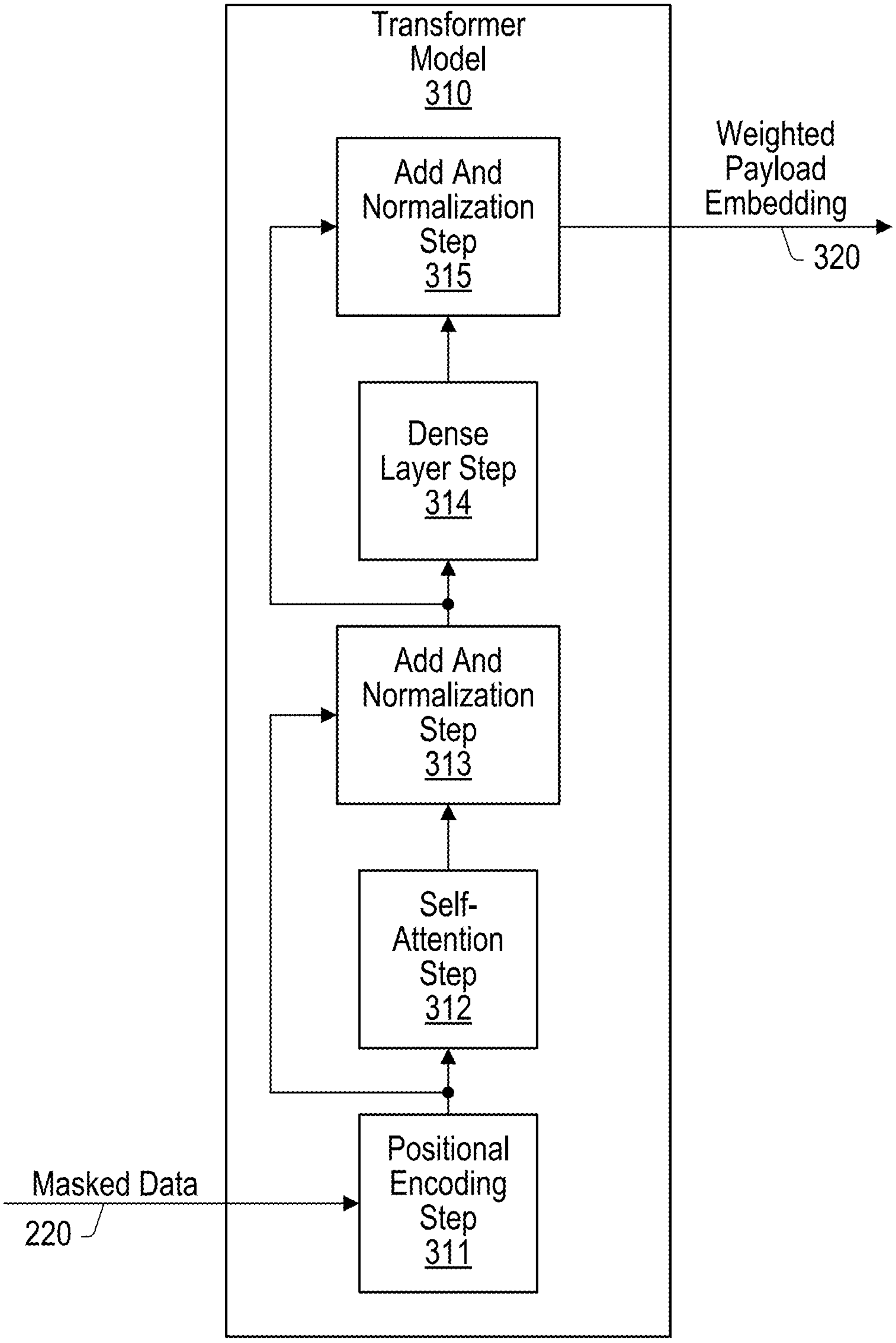
FIG. 3B is a block diagram of one embodiment of a transformer model that is capable of learning context from time-series data.

Turning now to FIG. 3B, a block diagram of a transformer model 310 is shown. In the illustrated embodiment, transformer model 310 begins with a positional encoding step 311. In various embodiments, transformer model 310 processes input payload embeddings in parallel and thus to preserve their ordering, adds positional encodings to the input payload embeddings. Accordingly, in positional encoding step 311, transformer model 310 encodes, for a payload embedding, positional information describing that embedding's position within a sequence of payload embeddings based on its timestamp. As an example, the unique positional encoding associated with a particular payload embedding may indicate that the particular payload is the third payload in a sequence of payloads and thus is associated with timestamp $t_3$. The positional encoding allows for transformer model 310 to distinguish the ordering of payload embeddings when using parallel computation. After producing a positional aware payload embeddings, transformer model 310 proceeds to a self-attention step 312.

In step 312, transformer model 310 uses a neural network and attention mechanism (e.g., a self-attention layer) to determine which payload embeddings in a sequence of payload embeddings are the most important towards bot detection, resulting in weighted embeddings. The self-attention layer weighs the importance of each payload embedding in an input sequence and adjusts their influence on the output embedding. For example, the self-attention layer is used to evaluate each payload embedding (and thus its payload) relative to the other payload embeddings within the sequence and assigns a set of weights (e.g., numerical values) to each payload embedding based on the embedding's determined level of importance towards bot detection. In some embodiments, the set of weights may be initialized randomly and are updated as the model learns to extract dependencies from the payload embeddings through a training process (e.g., backpropagation). Backpropagation, in various embodiments, is used to update each weighted value to minimize prediction error. If the attention layer determines that a payload embedding is more important, then the payload embedding, in various embodiments, is assigned a higher value. In contrast, the attention layer assigns a lower value to payload embeddings that are considered less important. The self-attention layer may produce a more context-aware embedding that captures linear relationships between payload embeddings in the sequence. After generating a set of weighted embeddings, transformer model 310 proceeds with add and normalization step 313.

In step 313, transformer model 310 adds the original input of the self-attention layer to the output of the self-attention layer, using a residual connection. A residual connection, in various embodiments, allows the output from one layer (e.g., output from step 311) to skip one or more layers in transformer model 310 and is used to improve training by mitigating a vanishing gradient problem during backpropagation. After summing the resulting embeddings, in various embodiments, transformer model 310 normalizes those embeddings by scaling the magnitude of the embeddings to fit withing a numerical range. For example, transformer model 310 may scale an embedding so that the mean of the embedding is 0 with a standard deviation of 1. Transformer model 310 may also normalize the embeddings using normalizing techniques such as layer normalization. After normalizing the embeddings, transformer model 310 proceeds with dense layer step 314.

In step 314, transformer model 310 uses a neural network (e.g., a dense layer) to introduce non-linear transformations to the embeddings, using an activation function (e.g., Rectified Linear Unit). A dense layer, in various embodiments, is a layer where all the nodes in the layer of the neural network connect to all the nodes in the previous layer, and an activation function determines if the node in the neural network is activated based on an activation value. For example, the node of a neural network may activate if the activation value from the activation function is a positive value. Otherwise, the node of the neural network with a negative value will not activate and thus will not produce an output. By introducing non-linear transformations, transformer model 310 identifies non-linear relationships within time-series data 110. After step 314, transformer model 310 proceeds with another add and normalization step 315. In step 315, transformer model 310 uses another residual connection to add the output of step 313 with the output of step 314. As previously discussed in step 312, the summed vectors are normalized, resulting in weighted payload embedding 320.

Figure 4A:
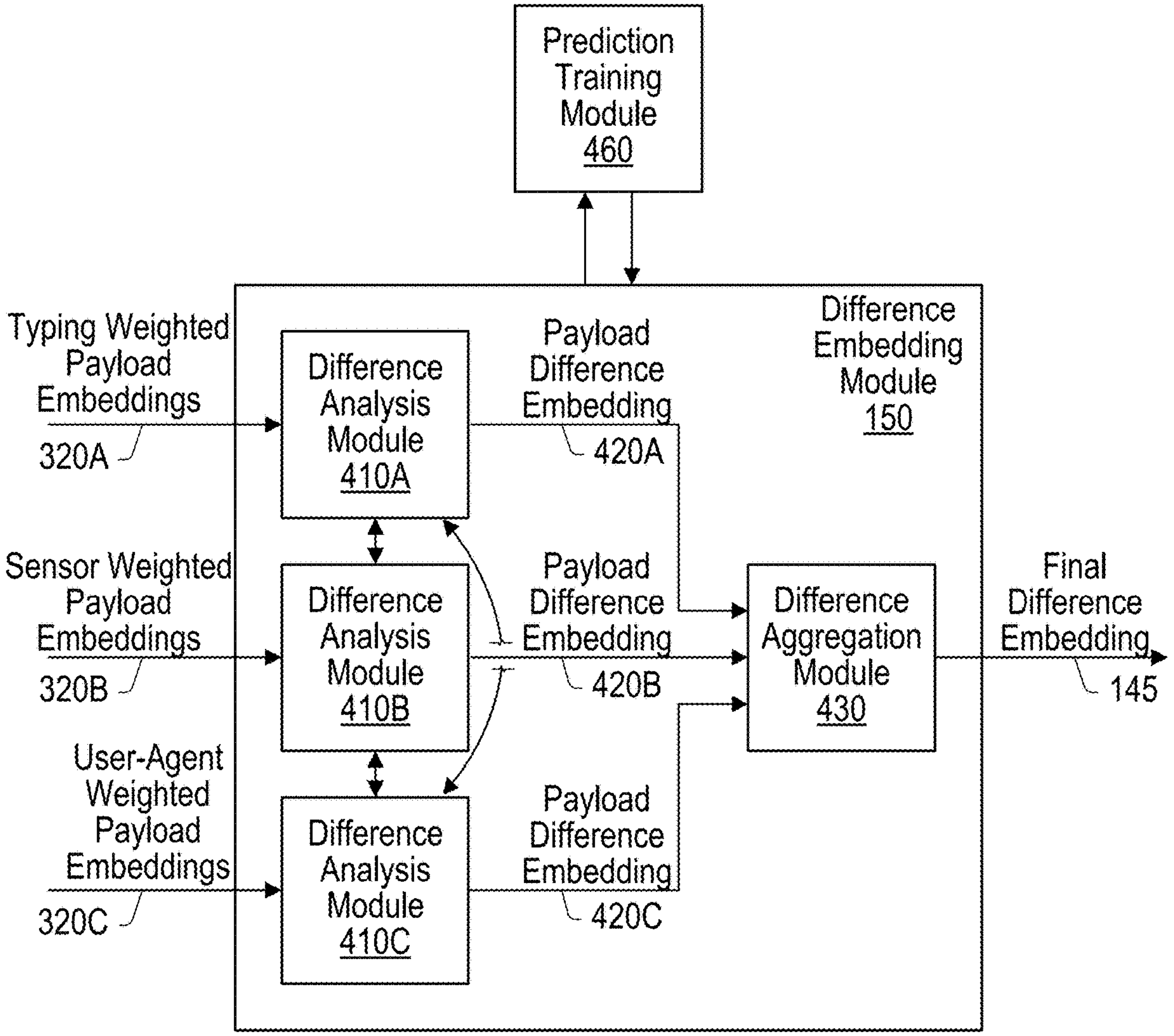
FIG. 4A is a block diagram of one embodiment of a difference embedding module that is capable of embedding the differences between expected and exhibited payload embeddings into a difference embedding.

Turning now to FIG. 4A, a block diagram of difference embedding module 150 is shown. In the illustrated embodiment, difference embedding module 150 includes difference analysis modules 410A-C and a difference aggregation module 430. The illustrated embodiment also includes a prediction training module 460. The illustrated embodiment may be implemented differently than shown—e.g., it might not include prediction training module 460.

As discussed, in various embodiments, difference embedding module 150 generates a final difference embedding 145 that encompasses the differences between expected/predicted payload embeddings and the actual/exhibited payload embedding obtained from time-series data 110. As shown, difference embedding module 150 receives (e.g., from data embedding module 130) typing weighted payload embeddings 320A, sensor weighted payload embeddings 320B, and user-agent weighted payload embeddings 320C, which are provided to difference analysis modules 410A-C, respectively. In various embodiments, a difference analysis module 410 is software that is executable to produce one or more payload difference embeddings 420 from weighted payload embeddings 320, using an encoder and a decoder process. A difference analysis module 410 may receive N weighted payload embeddings 320 and produce N payload difference embeddings 420. For example, difference analysis module 410A, 410B, and 410C receives typing weighted payload embeddings 320A, sensor weighted payload embeddings 320B, and user-agent weighted payload embeddings 320C respectively and produces difference embeddings 420A, 420B, and 420C respectively.

In some embodiments, a difference analysis module 410 may interact with a second difference analysis module 410 to allow the flow of intermediate outputs (e.g., output from the context encoder in FIG. 4B) between modules 410 from different data sources to form a more comprehensive representation when generating the expected embeddings. For example, difference analysis module 410A may generate expected embeddings for typing data based on both the intermediate output for typing data and the intermediate output for sensor data from difference analysis module 410B. An example of a difference analysis module 410 is discussed in more detail with respect to FIG. 4B. As shown, weighted difference embeddings 420 are sent to difference aggregation module 430.

Difference aggregation module 430, in various embodiments, is software executable to aggregate the received difference embeddings 420 into final difference embedding 145, using an aggregation function (e.g., element-wise aggregation). Difference aggregation module 430 may aggregate the difference embeddings 420 using summation, resulting in final difference embedding 145. Final difference embedding 145, in various embodiments, is representative of the set of difference between expected payloads and exhibited payloads from all data sources in a single vector. As an example, difference aggregation module 430 may receive difference embedding 420A, 420B, and 420C from difference analysis module 410 and aggregate the three embeddings into final difference embedding 145. Final difference embedding 145 may then be provided to prediction module 160.

Prediction training module 460, in various embodiments, trains difference analysis module 410, using payloads (training data) from licit computer-based interactions. The training data may be, for example, selected from a licit log-in process which includes a sequence of payloads for sensor reading data, user-agent data, and typing data. The training data is provided to data embedding module 130 to produce training weighted embeddings 320 for each data source (e.g., typing pattern, etc.), which are subsequently provided to difference embedding module 150. Prediction training module 460, in various embodiments, trains a difference analysis module 410 by first masking a payload embedding at a particular timestamp. That difference analysis module 410 attempts to predict the content for the masked payload, and then prediction training module 460 analyses the predicted content embedding relative to the original masked training embedding. For example, the difference analysis module 410 may attempt to predict the content of the masked training embedding at timestamp $t_3$, using the context of the embeddings from the previous timestamps, and the resulting embedding is compared to the original training embedding. In various embodiments, prediction training module 460 adjusts the parameters (e.g., weights) of the machine learning model(s) used in the difference analysis modules 410 until the difference between the predicted and training embedding are minimized.

Figure 4B:
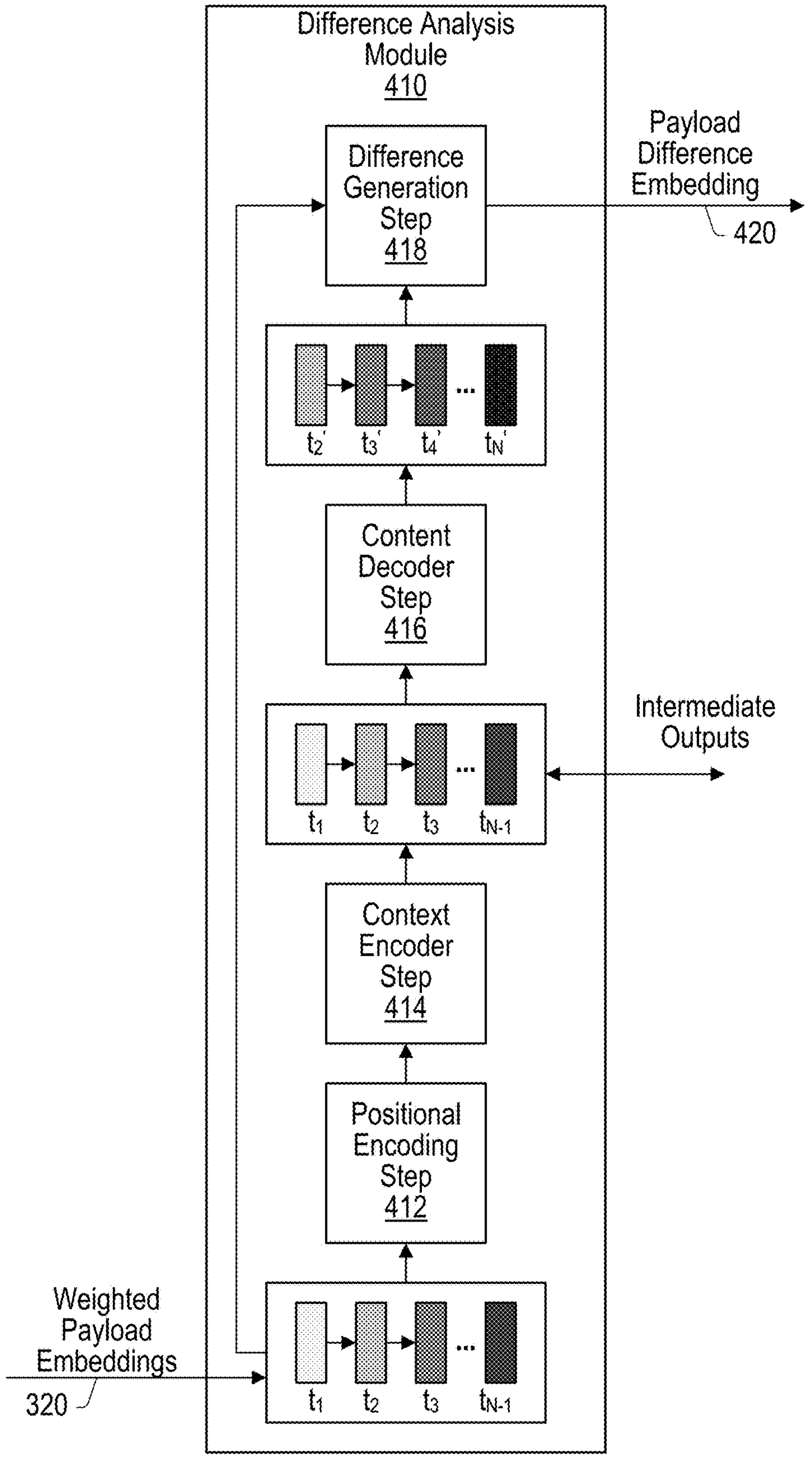
FIG. 4B is a block diagram of one embodiment of a difference analysis module that is capable of generating a difference embedding based on the differences between expected and exhibited payload embeddings of a given type (e.g., sensor weighted payload embeddings).

Turning now to FIG. 4B, a block diagram of a difference analysis module 410 is shown. As previously discussed, difference analysis module 410, in various embodiments, embeds the differences between expected payload embeddings and exhibited weighted payload embeddings 320 into one or more difference embeddings 420. In the illustrated embodiment, difference analysis module 410 begins with a position encoding step 412. In step 412, a positional encoder of different analysis module 410 encodes positional information describing a payload's position in a sequence of payloads. Difference analysis module 410 can distinguish the order of the payloads based on the positional encoding when using parallel computation. For example, the unique positional encoding associated with a particular payload embedding may indicate that the particular payload is associated with timestamp $t_2$. After step 412, the embeddings are provided to an encoder in a context encoder step 414.

In context encoder step 414, difference analysis module 410 derives context embeddings from a sequence of weighted payload embeddings 320 at each timestamp, using an encoder. For example, one of the weighted payload embeddings 320 at timestamp $t_1$ is analyzed by the encoder to derive the context embedding for timestamp $t_1$. The context embedding, in various embodiments, is a representation of the type of computer-based interaction. For example, the context embedding may represent a log-in process. In various embodiments, the context embedding of a particular timestamp is derived by the encoder using one of the weighted payload embeddings 320 of that particular timestamp and the weighted payload embeddings 320 from the previous timestamps. As an example, to derive the context embedding for timestamp $t_3$, the encoder evaluates the weighted payload embeddings 320 corresponding to timestamp $t_1$, $t_2$, and $t_3$. But in other embodiments, the context embedding of that particular timestamp is derived from only the weighted payload embedding 320 at that particular timestamp. Difference analysis module 410, in various embodiments, may receive context embeddings based on a second data source from a second difference analysis module 410 prior to step 416. For example, difference analysis module 410A may receive context embeddings from difference analysis module 410C. In other embodiments, difference analysis module 410 may provide one or more context embeddings to one or more difference analysis modules 410. The context embedding for each timestamp and each data source is provided to the decoder in a content decoder step 416.

In step 416, the decoder predicts the content of the payload embedding (e.g., expected content embedding) in the next timestamp in the form of an embedding based on the context embedding from the previous timestamp(s). In various embodiments, an expected content embedding is a payload embedding with the highest probability of occurring next in a sequence of a licit computer-based interaction. For example, when given the context of "typing username", the decoder may predict that the payload embedding in the next timestamp includes "typing password" in a licit log-in process. In various embodiments, the expected content embedding of a particular timestamp is derived by the decoder using the payload embeddings from all previous timestamps. For example, the expected content embedding for timestamp $t_4'$ is produced based on the payload embeddings for timestamp $t_1$, $t_2$, and $t_3$. But in some embodiments, the predicted content embedding of a particular timestamp is derived by the decoder using the payload embedding from only the preceding timestamp. For example, the payload for timestamp $t_1$ is analyzed by the decoder to predict and construct the expected content embedding for timestamp $t_2'$. In some embodiments, difference analysis module 410 may receive one or more context embeddings from context decoder step 414 from one or more difference analysis modules 410 to form a more comprehensive representation when generating the expected content embeddings. For example, difference analysis module 410A may receive a context embedding for sensor data at timestamp $t_1$ from difference analysis module 410B. Difference analysis module 410A may then analyze the context embeddings for typing data and sensor data at timestamp $t_1$ to generate an expected content embedding for $t_2'$. In other embodiments, difference analysis module 410 may provide one or more output content embeddings for timestamps $t_{n-1}$ to one or more difference analysis modules 410. After the expected content embeddings are constructed for $t_n'$ timestamps, the expected content embeddings are compared to the exhibited weighted payload embeddings 320 in difference generation step 418.

In step 418, difference analysis module 410 embeds the differences between the expected content embeddings and the exhibited weighted payload embeddings 320 into one or more difference embeddings per timestamp based on the distance between the embeddings (e.g., Euclidean distance). For example, the distance between the expected content embedding for timestamp $t_2'$ and exhibited payload embedding for timestamp $t_2$ is calculated, using Euclidean distance, and the calculated value is represented in a difference embedding for timestamp $t_2$. The difference embedding, in various embodiments, represents the abnormality between the exhibited computer-based interaction and a licit computer-based interaction. For example, a greater distance between the expected embedding and the exhibited embedding is equated to a higher probability of an illicit computer-based interaction. Difference analysis module 410, in various embodiments, may produce difference embedding for each expected and exhibited embedding pair. Using one or more difference embeddings, difference analysis module 410 concatenates the difference embeddings to produce payload difference embedding 420. Payload difference embedding 420, in various embodiments, represents all of the difference embeddings for a data source in a single vector. For example, difference analysis module 410 may concatenate a set of difference embeddings into a single vector to represent the difference between the senor reading data recorded from a log-in process and the sensor reading data from a licit log-in process. As discussed, difference analysis module 410 provides a set of payload difference embeddings 420 to difference aggregation module 430 to produce final difference embedding 145.

Figure 5:
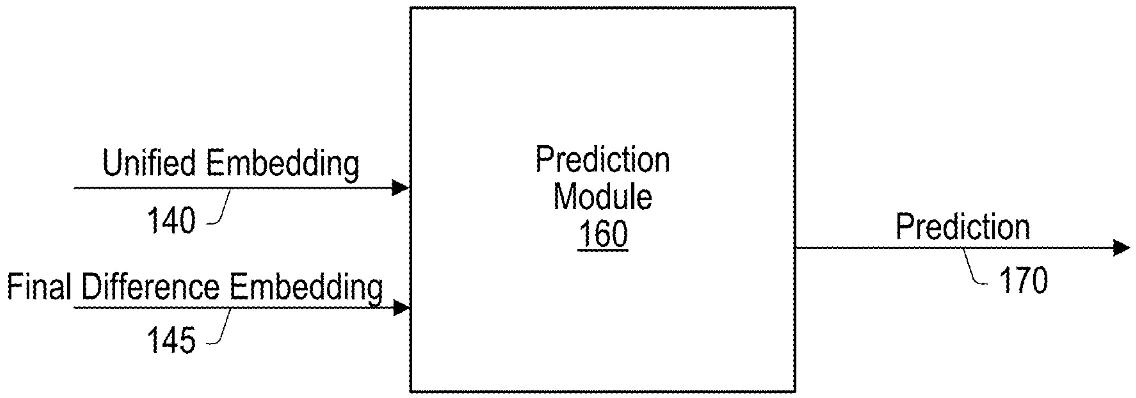
FIG. 5 is a block diagram of one embodiment of a prediction module that is capable of producing a prediction on whether a set of characteristics (e.g., performed by a computer bot) is exhibited in a computer-based interaction.

Turning now to FIG. 5, a block diagram of prediction module 160 is shown. In the illustrated embodiment, prediction module 160 receives unified embedding 140 and final difference embedding 145 and produces prediction 170. Prediction module 160 may be implemented differently than shown—e.g., prediction module 160 may also include logic for stopping or otherwise preventing a computer-based interaction that is predicted to involve a computer bot.

Prediction module 160, in various embodiments, is software executable to generate prediction 170 that indicates whether a computer-based interaction is thought to be performed by a computer bot, based on an aggregated representation of the unified embedding 140 and final difference embedding 145. Prediction module 160 receives unified embedding 140 and final difference embedding 145 from data embedding module 130 and difference embedding module 150 respectively. Prediction module 160, in various embodiments, aggregates (e.g., concatenates) unified embedding 140 and final difference embedding 145 into a single, total embedding for the computer-based interaction. The aggregated embedding may encapsulate the content of the computer-based interaction and a level of abnormality between the interaction and the same type of licit interaction. For example, the single embedding may encapsulate the content of a sign-up process and the level of abnormality when compared to known licit sign-up interactions.

In various embodiments, prediction module 160 then evaluates the distance between the aggregated embedding relative to related aggregated embeddings of licit computer-based interactions. If the distance is greater than a defined threshold (i.e., the distance between the aggregated embedding/vector and a point or area representing licit computer-based interactions is greater than the defined threshold), prediction module 160, in various embodiments, generates prediction 170 to indicate that the computer-based interaction is being performed by a bot. If the computer-based interaction is determined to be performed by a bot, prediction system 100 may cause the termination of the computer-based interaction. For example, if a log-in process is predicted to be performed by a bot, prediction system 100 may notify another computer system, causing the system to prevent the execution of the log-in process. But if the aggregated embedding falls within area of the embedding space that corresponds to licit interactions, then prediction module 160 generates prediction 170 to indicate that the computer-based interaction is not believed to be performed by a bot. In some embodiments, the aggregated embedding may be provided to a classification model. The classification model may produce prediction 170 from the aggregated embedding without measuring the distance between the aggregated embedding and a related aggregated embeddings.

Figure 6:
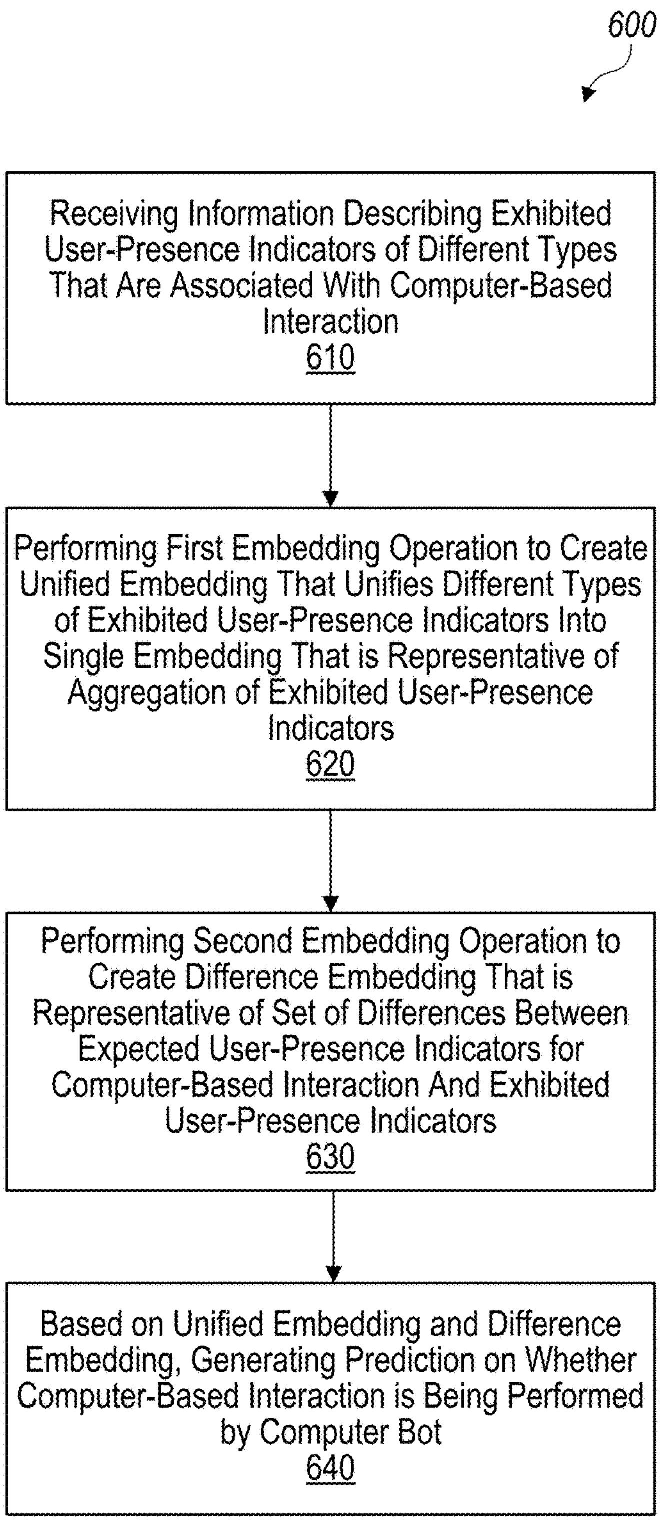
FIG. 6 is a flow diagram illustrating one embodiment of a method for predicting whether a computer-based interaction is being performed by a computer bot.

Turning now to FIG. 6, a flow diagram of a method 600 is shown. Method 600 is one embodiment of a method performed by a computer system (e.g., prediction system 100) to generate a prediction (e.g., prediction 170) for determining whether a computer-based interaction is performed by a computer bot. Method 600 may be performed by executing program instructions stored on a non-transitory computer-readable medium. Method 600 may include more or less steps than shown. For example, method 600 may include a step in which the prediction is provided to another computer system that is operable to determine whether to continue execution of the computer-based interaction based on whether the prediction indicates that the computer-based interaction is performed by a computer bot.

Method 600 begins in step 610 with the computer system receiving information (e.g., time-series data 110) describing exhibited user-presence indicators of different types (e.g., typing data 210A, sensor reading data 210B, user-agent data 210C) that are associated with the computer-based interaction. In various embodiments, the exhibited user-presence indicators are indicative of whether the computer-based interaction is being performed by a computer bot. The information may comprise a series of payloads associated with respective timestamps (e.g., $t_1$, $t_2$, etc.), and a given payload of the series of payloads may identify user-presence indicators exhibited at a time corresponding to a timestamp of the given payload. The exhibited user-presence indicators may indicate a set of movements of a computing device (e.g., sensor reading data 210B) used in the computer-based interaction and a typing pattern (e.g., typing data 210A) corresponding to input provided from the computing device. In various cases, the computer-based interaction corresponds to a login to access a particular user account associated with the computer system.

In step 620, the computer system performs a first embedding operation (e.g., using data embedding module 130) to create a unified embedding (e.g., unified embedding 140) that unifies the different types of exhibited user-presence indicators into a single embedding that is representative of an aggregation of the exhibited user-presence indicators. The computer system may generate a series of payload embeddings from a set of features extracted from the series of payloads and modify, using a machine learning model (e.g., a transformer model 310), the series of payload embeddings to generate a weighted series of payload embeddings (e.g., weighted payload embeddings 320). In various embodiments, a weighted payload embedding is generated by applying different priorities to data values included in a corresponding payload embedding and aggregating the weighted series of payload embeddings into the unified embedding. The computer system provides the unified embedding to a decoder machine learning model (e.g., reconstruction training module 360) to decode the unified embedding into a second series of weighted embeddings. The computer system trains an encoder machine learning model (e.g., transformer model 310A) based on differences between the first and second series of weighted embeddings (e.g., context-aware payload embeddings 335A-C). In various embodiments, the encoder machine learning model is used to generate unified embeddings.

In step 630, the computer system performs a second embedding operation (e.g., using difference embedding module 150) to create a difference embedding (e.g., final difference embedding 145) that is representative of a set of differences between expected user-presence indicators for the computer-based interaction and the exhibited user-presence indicators. The computer system generates, for a first payload of the series of payloads associated with a first timestamp, a predicted payload that is predicted to have occurred at a second timestamp (e.g., content decoder step 416). The computer system determines a difference between the predicted payload and a second payload of the series of payloads that occurred at the second timestamp (e.g., difference generation step 418) and incorporates the difference into the difference embedding (e.g., payload difference embedding 420).

In step 640, the computer system (e.g., prediction module 160) generates a prediction (e.g., prediction 170) on whether the computer-based interaction is being performed by a computer bot based on the unified embedding (e.g., unified embedding 140) and the difference embedding (e.g., final difference embedding 145). The computer system concatenates the first and second vectors to derive a result vector and provides the result vector as input into a classification model to generate the prediction on whether the computer-based interaction is being performed by a computer bot. Based on the prediction indicating that the computer-based interaction is being performed by a computer bot, the computer system causes the termination of the computer-based interaction.

Figure 7:
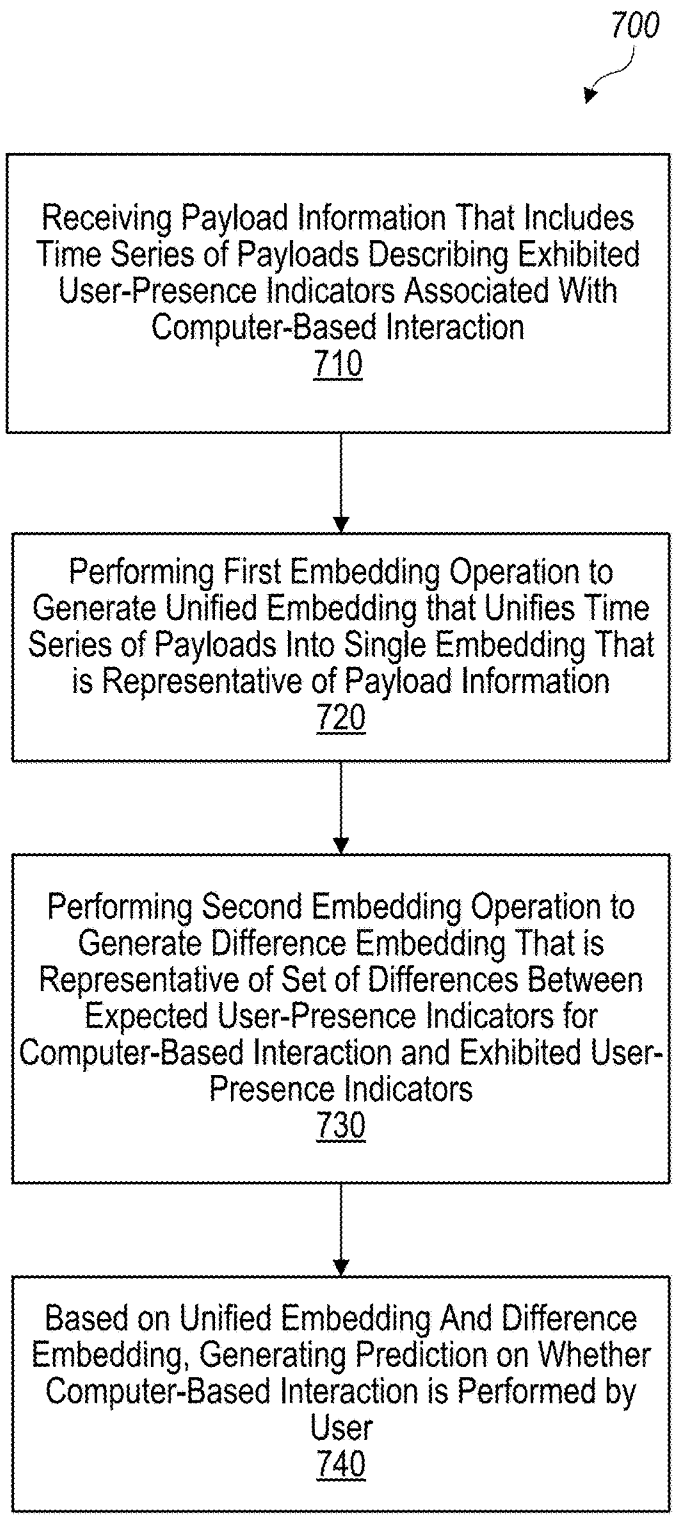
FIG. 7 is a flow diagram illustrating one embodiment of a method for predicting whether a computer-based interaction is being performed by a user.

Turning now to FIG. 7, a flow diagram of a method 700 is shown. Method 700 is one embodiment of a method performed by a computer system (e.g., prediction system 100) to generate a prediction (e.g., prediction 170) on whether a computer-based interaction is performed by a user. Method 700 may be performed by executing program instructions stored on a non-transitory computer-readable medium. Method 700 may include more or less steps than shown. For example, method 700 may include a step in which the prediction is provided to another computer system that is operable to determine whether to continue executing the computer-based interaction based on whether the prediction indicates that the computer-based interaction is performed by a user.

Method 700 begins in step 710 with the computer system receiving payload information that includes a time series of payloads (e.g., time-series data 110) describing exhibited user-presence indicators (e.g., typing data 210A, sensor reading data 210B, user-agent data 210C) associated with a computer-based interaction. In various embodiments, the exhibited user-presence indicators are indicative of whether the computer-based interaction is being performed by a user.

In step 720, the computer system performs a first embedding operation (e.g., using data embedding module 130) to generate a unified embedding (e.g., unified embedding 140) that unifies the time series of payloads into a single embedding that is representative of the payload information. The computer system may generate a series of positional embeddings (e.g., positional encoding step 311) that retain ordering information absent in the series of payload embeddings. In various embodiments, the ordering information retains a temporal ordering of the time series of payloads. The computer system may generate a series of payload embeddings from the time series of payloads and performs a set of attention operations on the series of payload embeddings to prioritize different values in the series of payload embeddings (e.g., using attention layer 330). The computer system aggregates the series of payload embeddings into the unified embedding by performing a mean pooling operation (e.g., using mean pooling module 340) in which payload embeddings of the series of payload embeddings corresponding to different types of user-presence indicators are added together and averaged.

In step 730, the computer system performs a second embedding operation (e.g., using difference embedding module 150) to generate a difference embedding (e.g., final difference embedding 145) that is representative of a set of differences between expected user-presence indicators for the computer-based interaction and the exhibited user-presence indicators. The computer system generates, for a first payload of the times series that is associated with a first timestamp, a predicted payload that is predicted to have occurred at a second timestamp in the time series (e.g., content decoder step 416). The computer system determines a difference between the predicted payload and a second payload of the time series that occurred at the second timestamp, and the difference embedding is created based on the difference (e.g., payload difference embedding 420). In step 740, the computer system (e.g., prediction module 160) generates a prediction (e.g., prediction 170) on whether the computer-based interaction is performed by a user based on the unified embedding (e.g., unified embedding 140) and the difference embedding (e.g., final difference embedding 145).

Figure 8:
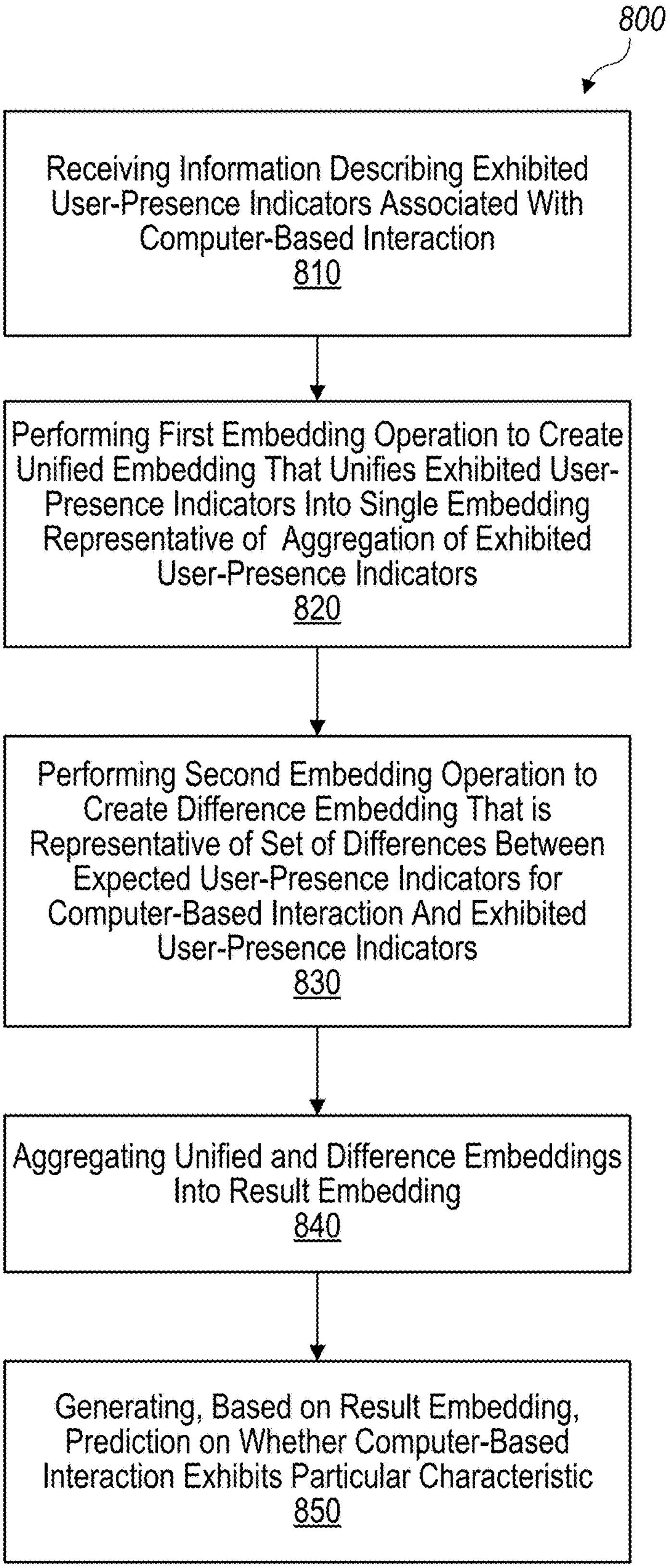
FIG. 8 is a flow diagram illustrating one embodiment of a method for predicting whether a computer-based interaction exhibits a particular characteristic.

Turning now to FIG. 8, a flow diagram of a method 800 is shown. Method 800 is one embodiment of a method performed by a computer system (e.g., prediction system 100) to generate a prediction (e.g., prediction 170) on whether a computer-based interaction exhibits a particular characteristic. The computer system may include at least one processor and a memory having program instructions stored thereon that are executable by the at least one processor to cause the system to perform method 800. Method 800 may include more or less steps than shown. For example, method 800 may include a step in which the prediction is provided to another computer system that is operable to determine whether to perform a computer-based interaction based on whether the prediction indicates that the computer-based interaction exhibits a particular characteristic.

Method 800 begins in step 810 with the computer system receiving information (e.g., time-series data 110) describing exhibited user-presence indicators (e.g., typing data 210A, sensor reading data 210B, user-agent data 210C) associated with a computer-based interaction. In various embodiments, the exhibited user-presence indicators are indicative of whether the computer-based interaction exhibits a particular characteristic. In various embodiments, the exhibited user-presence indicators indicate a user agent (e.g., user-agent data 210C) involved in the computer-based interaction.

In step 820, the computer system performs a first embedding operation (e.g., using data embedding module 130) to create a unified embedding (e.g., unified embedding 140) that unifies the exhibited user-presence indicators into a single embedding representative of an aggregation of the exhibited user-presence indicators. The computer system generates a first series of payload embeddings corresponding to a first type of user-presence indicator (e.g., weighted payload embeddings 320A) and a second series of payload embeddings corresponding to a second type of user-presence indicator (e.g., weighted payload embeddings 320B). The computer system performs a first weight operation (e.g., self-attention step 312) to prioritize values of a payload embedding of the first series of payload embeddings based on other ones of the first series of payload embeddings. In various embodiments, the first weight operation results in a first series of weighted payload embeddings and a second series of weight payload embeddings. The computer system performs a second weight operation (e.g., using attention layer 330) to prioritize values of a weighted payload embedding of the first series of weighted payload embeddings and a weighted payload embedding of the second series of weighted payload embeddings based on both the first series of weighted payload embeddings and the second series of weighted payload embeddings, and the unified embedding (e.g., unified embedding 140) is generated from a result of the second weight operation. In various embodiments, the first weight operation is performed using a first machine learning model (e.g., transformer model 310) and the second weight operation is performed using a second machine learning model (e.g., attention layer 330).

In step 830, the computer system performs a second embedding operation (e.g., using difference embedding module 150) to create a difference embedding (e.g., final difference embedding 145) that is representative of a set of differences between expected user-presence indicators for the computer-based interaction and the exhibited user-presence indicators. The computer system generates, for a first payload of the series of payloads associated with a first timestamp, a predicted payload that is predicted to have occurred at a second timestamp (e.g., content decoder step 416). The computer system determines a difference (e.g., difference generation step 418) between the predicted payload and a second payload of the series of payloads that occurred at the second timestamp and incorporates the difference into the difference embedding (e.g., payload difference embedding 420).

In step 840, the computer system aggregates the unified embedding (e.g., unified embedding 140) and difference embeddings (final difference embedding 145) into a result embedding. In step 850, the computer system generates, based on the result embedding, a prediction (e.g., prediction 170) on whether the computer-based interaction exhibits the particular characteristic.

Exemplary Computer System

Figure 9:
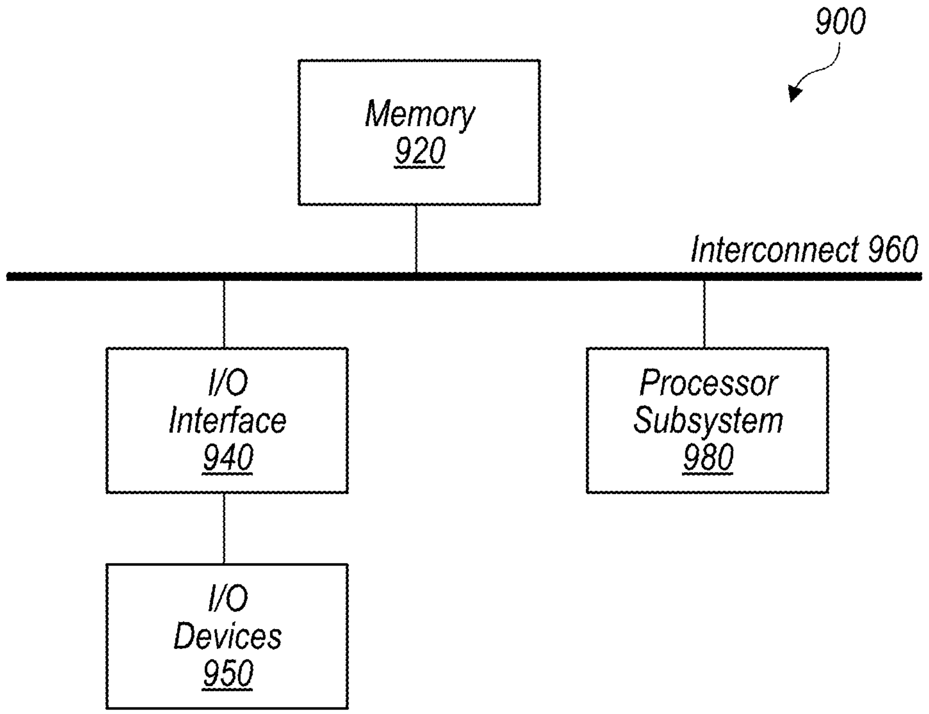
FIG. 9 is a block diagram illustrating elements of a computer system for implementing various systems described in the present disclosure, according to some embodiments.

Turning now to FIG. 9, a block diagram of an exemplary computer system 900, which may implement prediction system 100, is depicted. Computer system 900 includes a processor subsystem 980 that is coupled to a system memory 920 and I/O interfaces(s) 940 via an interconnect 960 (e.g., a system bus). I/O interface(s) 940 is coupled to one or more I/O devices 950. Although a single computer system 900 is shown in FIG. 9 for convenience, system 900 may also be implemented as two or more computer systems operating together.

Processor subsystem 980 may include one or more processors or processing units. In various embodiments of computer system 900, multiple instances of processor subsystem 980 may be coupled to interconnect 960. In various embodiments, processor subsystem 980 (or each processor unit within 980) may contain a cache or other form of on-board memory.

System memory 920 is usable store program instructions executable by processor subsystem 980 to cause system 900 perform various operations described herein. System memory 920 may be implemented using different physical memory media, such as hard disk storage, floppy disk storage, removable disk storage, flash memory, random access memory (RAM—SRAM, EDO RAM, SDRAM, DDR SDRAM, RAMBUS RAM, etc.), read only memory (PROM, EEPROM, etc.), and so on. Memory in computer system 900 is not limited to primary storage such as memory 920. Rather, computer system 900 may also include other forms of storage such as cache memory in processor subsystem 980 and secondary storage on I/O Devices 950 (e.g., a hard drive, storage array, etc.). In some embodiments, these other forms of storage may also store program instructions executable by processor subsystem 980. In some embodiments, program instructions that when executed implement masking module 120, data embedding module 130, difference embedding module 150, and prediction module 160 may be included/stored within system memory 920.

I/O interfaces 940 may be any of various types of interfaces configured to couple to and communicate with other devices, according to various embodiments. In one embodiment, I/O interface 940 is a bridge chip (e.g., Southbridge) from a front-side to one or more back-side buses. I/O interfaces 940 may be coupled to one or more I/O devices 950 via one or more corresponding buses or other interfaces. Examples of I/O devices 950 include storage devices (hard drive, optical drive, removable flash drive, storage array, SAN, or their associated controller), network interface devices (e.g., to a local or wide-area network), or other devices (e.g., graphics, user interface devices, etc.). In one embodiment, computer system 900 is coupled to a network via a network interface device 950 (e.g., configured to communicate over WiFi, Bluetooth, Ethernet, etc.).

The present disclosure includes references to "embodiments," which are non-limiting implementations of the disclosed concepts. References to "an embodiment," "one embodiment," "a particular embodiment," "some embodiments," "various embodiments," and the like do not necessarily refer to the same embodiment. A large number of possible embodiments are contemplated, including specific embodiments described in detail, as well as modifications or alternatives that fall within the spirit or scope of the disclosure. Not all embodiments will necessarily manifest any or all of the potential advantages described herein.

This disclosure may discuss potential advantages that may arise from the disclosed embodiments. Not all implementations of these embodiments will necessarily manifest any or all of the potential advantages. Whether an advantage is realized for a particular implementation depends on many factors, some of which are outside the scope of this disclosure. In fact, there are a number of reasons why an implementation that falls within the scope of the claims might not exhibit some or all of any disclosed advantages. For example, a particular implementation might include other circuitry outside the scope of the disclosure that, in conjunction with one of the disclosed embodiments, negates or diminishes one or more the disclosed advantages. Furthermore, suboptimal design execution of a particular implementation (e.g., implementation techniques or tools) could also negate or diminish disclosed advantages. Even assuming a skilled implementation, realization of advantages may still depend upon other factors such as the environmental circumstances in which the implementation is deployed. For example, inputs supplied to a particular implementation may prevent one or more problems addressed in this disclosure from arising on a particular occasion, with the result that the benefit of its solution may not be realized. Given the existence of possible factors external to this disclosure, it is expressly intended that any potential advantages described herein are not to be construed as claim limitations that must be met to demonstrate infringement. Rather, identification of such potential advantages is intended to illustrate the type(s) of improvement available to designers having the benefit of this disclosure. That such advantages are described permissively (e.g., stating that a particular advantage "may arise") is not intended to convey doubt about whether such advantages can in fact be realized, but rather to recognize the technical reality that realization of such advantages often depends on additional factors.

Unless stated otherwise, embodiments are non-limiting. That is, the disclosed embodiments are not intended to limit the scope of claims that are drafted based on this disclosure, even where only a single example is described with respect to a particular feature. The disclosed embodiments are intended to be illustrative rather than restrictive, absent any statements in the disclosure to the contrary. The application is thus intended to permit claims covering disclosed embodiments, as well as such alternatives, modifications, and equivalents that would be apparent to a person skilled in the art having the benefit of this disclosure.

For example, features in this application may be combined in any suitable manner. Accordingly, new claims may be formulated during prosecution of this application (or an application claiming priority thereto) to any such combination of features. In particular, with reference to the appended claims, features from dependent claims may be combined with those of other dependent claims where appropriate, including claims that depend from other independent claims. Similarly, features from respective independent claims may be combined where appropriate.

Accordingly, while the appended dependent claims may be drafted such that each depends on a single other claim, additional dependencies are also contemplated. Any combinations of features in the dependent that are consistent with this disclosure are contemplated and may be claimed in this or another application. In short, combinations are not limited to those specifically enumerated in the appended claims.

Where appropriate, it is also contemplated that claims drafted in one format or statutory type (e.g., apparatus) are intended to support corresponding claims of another format or statutory type (e.g., method).

Because this disclosure is a legal document, various terms and phrases may be subject to administrative and judicial interpretation. Public notice is hereby given that the following paragraphs, as well as definitions provided throughout the disclosure, are to be used in determining how to interpret claims that are drafted based on this disclosure.

References to a singular form of an item (i.e., a noun or noun phrase preceded by "a," "an," or "the") are, unless context clearly dictates otherwise, intended to mean "one or more." Reference to "an item" in a claim thus does not, without accompanying context, preclude additional instances of the item. A "plurality" of items refers to a set of two or more of the items.

The word "may" is used herein in a permissive sense (i.e., having the potential to, being able to) and not in a mandatory sense (i.e., must).

The terms "comprising" and "including," and forms thereof, are open-ended and mean "including, but not limited to."

When the term "or" is used in this disclosure with respect to a list of options, it will generally be understood to be used in the inclusive sense unless the context provides otherwise. Thus, a recitation of "x or y" is equivalent to "x or y, or both," and thus covers 1) x but not y, 2) y but not x, and 3) both x and y. On the other hand, a phrase such as "either x or y, but not both" makes clear that "or" is being used in the exclusive sense.

A recitation of "w, x, y, or z, or any combination thereof" or "at least one of . . . w, x, y, and z" is intended to cover all possibilities involving a single element up to the total number of elements in the set. For example, given the set [w, x, y, z], these phrasings cover any single element of the set (e.g., w but not x, y, or z), any two elements (e.g., w and x, but not y or z), any three elements (e.g., w, x, and y, but not z), and all four elements. The phrase "at least one of . . . w, x, y, and z" thus refers to at least one element of the set [w, x, y, z], thereby covering all possible combinations in this list of elements. This phrase is not to be interpreted to require that there is at least one instance of w, at least one instance of x, at least one instance of y, and at least one instance of z.

Various "labels" may precede nouns or noun phrases in this disclosure. Unless context provides otherwise, different labels used for a feature (e.g., "first circuit," "second circuit," "particular circuit," "given circuit," etc.) refer to different instances of the feature. Additionally, the labels "first," "second," and "third" when applied to a feature do not imply any type of ordering (e.g., spatial, temporal, logical, etc.), unless stated otherwise.

The phrase "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

The phrases "in response to" and "responsive to" describe one or more factors that trigger an effect. This phrase does not foreclose the possibility that additional factors may affect or otherwise trigger the effect, either jointly with the specified factors or independent from the specified factors. That is, an effect may be solely in response to those factors, or may be in response to the specified factors as well as other, unspecified factors. Consider the phrase "perform A in response to B." This phrase specifies that B is a factor that triggers the performance of A, or that triggers a particular result for A. This phrase does not foreclose that performing A may also be in response to some other factor, such as C. This phrase also does not foreclose that performing A may be jointly in response to B and C. This phrase is also intended to cover an embodiment in which A is performed solely in response to B. As used herein, the phrase "responsive to" is synonymous with the phrase "responsive at least in part to." Similarly, the phrase "in response to" is synonymous with the phrase "at least in part in response to."

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical). More specifically, this formulation is used to indicate that this structure is arranged to perform the one or more tasks during operation. A structure can be said to be "configured to" perform some task even if the structure is not currently being operated. Thus, an entity described or recited as being "configured to" perform some task refers to something physical, such as a device, circuit, a system having a processor unit and a memory storing program instructions executable to implement the task, etc. This phrase is not used herein to refer to something intangible.

In some cases, various units/circuits/components may be described herein as performing a set of task or operations. It is understood that those entities are "configured to" perform those tasks/operations, even if not specifically noted.

The term "configured to" is not intended to mean "configurable to." An unprogrammed FPGA, for example, would not be considered to be "configured to" perform a particular function. This unprogrammed FPGA may be "configurable to" perform that function, however. After appropriate programming, the FPGA may then be said to be "configured to" perform the particular function.

For purposes of United States patent applications based on this disclosure, reciting in a claim that a structure is "configured to" perform one or more tasks is expressly intended not to invoke 35 U.S.C. § 112(f) for that claim element. Should Applicant wish to invoke Section 112(*f*) during prosecution of a United States patent application based on this disclosure, it will recite claim elements using the "means for" [performing a function] construct.

What is claimed is:

1. A method for predicting whether a computer-based interaction is being performed by a computer bot, the method comprising:

receiving, by a computer system, information describing exhibited user-presence indicators of different types associated with the computer-based interaction;

performing, by the computer system, a first embedding operation that includes:

generating a plurality of sets of embeddings, a given set of which corresponds to a respective one of the different types of exhibited user-presence indicators;

performing a first weight operation to prioritize values of an embedding of the given set of embeddings based on other embeddings of the given set, the first weight operation resulting in a plurality of sets of weighted embeddings;

performing a second weight operation to prioritize values of weighted embeddings across the plurality of sets of weighted embeddings relative to one another; and generating, from a result of the second weight operation, a unified embedding that unifies the different types of exhibited user-presence indicators into a single embedding that is representative of an aggregation of the exhibited user-presence indicators;

performing, by the computer system, a second embedding operation using the plurality of sets of weighted embeddings to create a difference embedding that is representative of a set of differences between expected user-presence indicators for the computer-based interaction and the exhibited user-presence indicators; and based on the unified embedding and the difference embedding, the computer system generating a prediction on whether the computer-based interaction is being performed by a computer bot.

2. The method of claim 1, wherein the information comprises a series of payloads associated with respective timestamps, and wherein a given payload of the series of payloads identifies user-presence indicators exhibited at a time corresponding to a timestamp of the given payload.

3. The method of claim 2, wherein the generating of the unified embedding includes:

aggerating embeddings of the result of the second weight operation into the unified embedding.

4. The method of claim 2, wherein the second embedding operation includes:

generating, for a first payload of the series of payloads associated with a first timestamp, a predicted payload that is predicted to have occurred at a second timestamp;

determining a difference between the predicted payload and a second payload of the series of payloads that occurred at the second timestamp; and incorporating the difference into the difference embedding.

5. The method of claim 1, wherein the unified embedding is created from a first series of weighted embeddings included in the result of the second weight operation, and wherein the method further comprises:

providing, by the computer system, the unified embedding to a decoder machine learning model to decode the unified embedding into a second series of weighted embeddings; and training, by the computer system, an encoder machine learning model based on differences between the first and second series of weighted embeddings, wherein the encoder machine learning model is used to generate unified embeddings.

6. The method of claim 5, wherein the encoder machine learning model is trained based on at least a set of incomplete data describing exhibited user-presence indicators associated with one or more computer-based interactions, wherein a portion of the incomplete data is derived by masking a portion of complete data such that the masked portion represents missing data.

7. The method of claim 1, wherein the unified and difference embeddings correspond to first and second vectors, respectively, and wherein the generating of the prediction includes:

concatenating the first and second vectors to derive a result vector; and providing the result vector as input into a classification model to generate the prediction on whether the computer-based interaction is being performed by a computer bot.

8. The method of claim 1, wherein the exhibited user-presence indicators indicate a set of movements of a computing device used in the computer-based interaction and a typing pattern corresponding to input provided from the computing device.

9. The method of claim 1, further comprising:
based on the prediction indicating that the computer-based interaction is being performed by a computer bot, the computer system causing termination of the computer-based interaction.

10. The method of claim 1, wherein the computer-based interaction corresponds to a login to access a particular user account associated with the computer system.

11. A non-transitory computer-readable medium having program instructions stored thereon that are executable by a computer system to perform operations comprising:
receiving payload information that includes a time series of payloads describing exhibited user-presence indicators associated with a computer-based interaction, wherein the exhibited user-presence indicators are indicative of whether the computer-based interaction is being performed by a user;
performing a first embedding operation that includes:
generating a plurality of sets of embeddings, a given set of which corresponds to a respective one of different types of the exhibited user-presence indicators;
performing a first weight operation to prioritize values of an embedding of the given set of embeddings based on other embeddings of the given set, the first weight operation resulting in a plurality of sets of weighted embeddings;
performing a second weight operation to prioritize values of weighted embeddings across the plurality of sets of weighted embeddings relative to one another; and
generating, from a result of the second weight operation, a unified embedding that unifies the time series of payloads into a single embedding that is representative of the payload information;
performing a second embedding operation using the plurality of sets of weighted embeddings to generate a difference embedding that is representative of a set of differences between expected user-presence indicators for the computer-based interaction and the exhibited user-presence indicators; and
based on the unified embedding and the difference embedding, generating a prediction on whether the computer-based interaction is performed by a user.

12. The non-transitory computer-readable medium of claim 11, wherein the generating of the unified embedding includes:
aggregating embeddings of the result of the second weight operation into the unified embedding.

13. The non-transitory computer-readable medium of claim 12, the aggregating includes:
performing a mean pooling operation in which the embeddings of the result of the second weight operation that correspond to the different types of user-presence indicators are added together and averaged.

14. The non-transitory computer-readable medium of claim 12, wherein the first embedding operation includes:
generating a series of positional embeddings that retain ordering information, wherein the ordering information retains a temporal ordering of the time series of payloads, and wherein one set of the plurality of sets of embeddings corresponds to the series of positional embeddings.

15. The non-transitory computer-readable medium of claim 11, wherein the second embedding operation includes:
generating, for a first payload of the times series that is associated with a first timestamp, a predicted payload that is predicted to have occurred at a second timestamp in the time series; and
determining a difference between the predicted payload and a second payload of the time series that occurred at the second timestamp, wherein the difference embedding is created based on the difference.

16. A system, comprising:
at least one processor; and
a memory having program instructions stored thereon that are executable by the at least one processor to cause the system to perform operations comprising:
receiving information describing exhibited user-presence indicators associated with a computer-based interaction, wherein the exhibited user-presence indicators are indicative of whether the computer-based interaction exhibits a particular characteristic;
performing a first embedding operation that includes:
generating a plurality of sets of embeddings, a given set of which corresponds to a respective one of different types of the exhibited user-presence indicators;
performing a first weight operation to prioritize values of an embedding of the given set of embeddings based on other embeddings of the given set, the first weight operation resulting in a plurality of sets of weighted embeddings;
performing a second weight operation to prioritize values of weighted embeddings across the plurality of sets of weighted embeddings relative to one another; and
generating, from a result of the second weight operation, a unified embedding that unifies the exhibited user-presence indicators into a single embedding representative of an aggregation of the exhibited user-presence indicators;
performing a second embedding operation using the plurality of sets of weighted embeddings to create a difference embedding that is representative of a set of differences between expected user-presence indicators for the computer-based interaction and the exhibited user-presence indicators;
aggregating the unified and difference embeddings into a result embedding; and
generating, based on the result embedding, a prediction on whether the computer-based interaction exhibits the particular characteristic.

17. The system of claim 16, wherein the first weight operation is performed using a first machine learning model and the second weight operation is performed using a second machine learning model.

18. The system of claim 16, wherein the information comprises a series of payloads associated with respective timestamps, and wherein the second embedding operation includes:
generating, for a first payload of the series of payloads associated with a first timestamp, a predicted payload that is predicted to have occurred at a second timestamp;
determining a difference between the predicted payload and a second payload of the series of payloads that occurred at the second timestamp; and
incorporating the difference into the difference embedding.

19. The system of claim 16, wherein the exhibited user-presence indicators indicate a user agent involved in the computer-based interaction.

* * * * *